United States Patent [19]

Olechowski

[11] 3,725,371
[45] Apr. 3, 1973

[54] CATALYZED MOLECULAR SIZING PROCESS

[75] Inventor: Jerome Robert Olechowski, Trenton, N.J.

[73] Assignee: Cities Service Company, New York, N.Y.

[22] Filed: May 21, 1971

[21] Appl. No.: 145,956

[52] U.S. Cl.......260/85.3 R, 260/88.2 D, 260/88.2 S
[51] Int. Cl. ............................C08d 5/02, C08f 15/04
[58] Field of Search..........................260/85.3, 88.2 S

[56] References Cited

UNITED STATES PATENTS

| | | | |
|---|---|---|---|
| 3,211,710 | 10/1965 | Hendriks et al. | 260/85.3 |
| 3,440,237 | 4/1969 | Mohus | 260/94.9 |
| 3,539,654 | 11/1970 | Pautrat et al. | 260/768 |
| 3,562,804 | 2/1971 | Powers | 260/85.3 |

Primary Examiner—Joseph L. Schofer
Assistant Examiner—A. Holler
Attorney—J. Richard Geaman

[57] ABSTRACT

Low molecular weight Butyl-type copolymers having narrow molecular weight distributions are prepared by contacting a higher molecular weight Butyl-type copolymer, e.g., a Butyl rubber, with a catalyst composition comprising a transition metal salt, an organometallic compound of a metal of Group I-A, II-A, II-B, or III-A of the Periodic Table, a proton donor, and carbon monoxide. The catalyst composition preferably comprises a halide of tungsten, molybdenum, or rhenium, an alkyl aluminum halide, a lower alkanol, and carbon monoxide.

20 Claims, No Drawings

CATALYZED MOLECULAR SIZING PROCESS

BACKGROUND OF THE INVENTION

This invention relates to low molecular weight Butyl-type copolymers having narrow molecular weight distributions and more particularly relates to a process for preparing such copolymers by the molecular sizing of higher molecular weight Butyl-type copolymers, such as Butyl-type rubbers.

2. Description of the Prior Art

As disclosed in copending application Ser. No. 139,255, filed Apr. 30, 1971, in the name of Jerome Robert Olechowski, low molecular weight Butyl-type copolymers useful in sealants, coatings, electrical encapsulants, blends, and binders and as intermediates for the production of low molecular weight chlorobutyl-type copolymers may be prepared by the molecular sizing of Butyl-type rubbers with a catalyst composition comprising a transition metal salt, an organometallic compound of a Group I-A, II-A, II-B, or III-A metal, and a proton donor. The products of this process are generally satisfactory but have broader molecular weight distributions than are desirable for some applications. For example, these products typically have weight average molecular weight/number average molecular weight ratios ($M_w/M_n$) higher than 5, whereas it is frequently desirable that the copolymers have $M_w/M_n$ ratios lower than 4.

SUMMARY OF THE INVENTION

The primary object of this invention is to prepare low molecular weight Butyl-type copolymers having narrow molecular weight ditributions from higher molecular weight Butyl-type copolymers.

This and other objects are attained by contacting an isobutylene-conjugated polyene copolymer having a combined polyene content of about 1–5 mol percent with a catalyst composition comprising (1) a transition metal salt, (2) an organometallic compound of a metal of Group I-A, II-A, II-B, or III-A of the Periodic Table, (3) a proton donor selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl, and (4) carbon monoxide.

DESCRIPTION OF THE PREFERRED EMBODIMENTS

As indicated above, the Butyl-type copolymer which is treated in accordance with the present invention may be any isobutylene-conjugated polyene copolymer having a combined polyene content of about 1–5 mol percent. The combined polyene units may be derived from any conjugated polyene monomers containing at least four carbon atoms and at least two ethylenic double bonds. Ordinarily, however, the units are derived from one or more aliphatic or cycloaliphatic monomers containing four to 18 carbon atoms and two to four conjugated double bonds, e.g., butadiene, isoprene, piperylene, 2,3-dimethylbutadiene, cyclooctadiene, cyclododecatriene, cyclooctadecatetraene, etc. The copolymers having a content of about 1 to 3 mol percent of a combined aliphatic conjugated diene containing four to six carbon atoms, especially isoprene, are preferred.

Although the copolymer may be a low molecular weight copolymer having a broad molecular weight distribution, e.g., a copolymer prepared by the process of the afore-mentioned copending application or a copolymer prepared by thermal scission of a Butyl-type rubber, it is preferably a Butyl-type rubber, i.e., a copolymer having a viscosity average molecular weight of about 300,000–500,000. However, the product is a copolymer having a lower molecular weight than the starting material and a narrow molecular weight distribution, regardless of whether the starting material has a high or low molecular weight or a broad or narrow molecular weight distribution.

The transition metal salt employed as a component of the catalyst system may be one or more salts of a transition metal such as lanthanum, titanium, zirconium, hafnium, vanadium, niobium, tantalum, chromium, molybdenum, tungsten, manganese, rhenium, ruthenium, osmium, rhodium, iridium, or palladium. Preferably the salt is a halide, more preferably a chloride, but other salts such as the oxyhalides, sulfates, nitrates, phosphates, acetates, propionates, benzoates, acetylacetonates, etc. are also utilizable.

Exemplary of such salts are lanthanum trichloride, titanium tetrachloride, titanium trichloride, zirconium trichloride, hafnium tetrachloride, vanadium oxytrichloride, niobium pentabromide, tantalum pentaiodide, chromic chloride, molybdenum pentachloride, molybdenum pentafluoride, molybdenum hexabromide, molybdenum dichloride, molybdenum oxytetrachloride, molybdenum nitrate, molybdenum acetate, molybdenum propionate, molybdenum benzoate, molybdenum acetylacetonate, molybdenum sulfate, molybdenum phosphate, tungsten hexachloride, tungsten dichloride, tunsten pentabromide, tungsten hexafluoride, tungsten oxytetrachloride, tungsten sulfate, manganese trichloride, rhenium heptachloride, rhenium hexachloride, rhenium hexafluoride, rhenium pentachloride, ruthenium sesquichloride, osmium tetrachloride, rhodium sesquichloride, iridic chloride, palladous iodide, etc.

The preferred salts are the halides of tungsten, molybdenum, and rhenium, especially tungsten hexachloride, molybdenum pentachloride, and rhenium pentachloride. Ordinarily the transition metal salt is employed in an amount such as to provide about 0.0002–0.01, preferably about 0.0002–0.0004, mol of transition metal per mol of copolymer being treated.

The organometallic component of the catalyst system may be one or more organometallic compounds of metals of Groups I-A, II-A, II-B, and III-A of the Periodic Table of Elements. [The Periodic Table to which reference is made is Deming's Periodic Table, which may be found in Lange, "Handbook of Chemistry," Ninth Edition, McGraw-Hill Book Company, Inc. (New York - Toronto - London), 1956, pages 56–57.] When the metal of the organometallic compound is multivalent, any valence not satisfied by an organic group may be satisfied by hydrogen, chlorine, bromine, iodine, or fluorine. The organic groups in these compounds are preferably alkyl groups containing one to 10 carbon atoms or aryl groups such as phenyl, tolyl, or naphthyl.

Exemplary of the organometallic compounds are methyl lithium, butyl lithiums, phenyl lithium, naphthyl lithiums, ethyl sodium, propyl potassiums, butyl rubidiums, pentyl cesiums, octyl beryllium chlorides, dimethyl magnesium, methyl magnesium bromide, diethyl calcium, ethyl calcium iodide, dipentyl strontiums, naphthyl strontium fluorides, dipropyl bariums, phenyl barium chloride, dihexyl zincs, ethyl zinc chloride, dioctyl cadmiums, butyl cadmium chlorides, trimethyl borine, phenyl boron dibromide, pentyl galliums bromides, hexyl indium chlorides, heptyl thallium chlorides, trimethyl aluminum, triethyl aluminum, tripropyl aluminums, tributyl aluminums, tripentyl aluminums, trihexyl aluminums, triheptyl aluminums, trioctyl aluminums, trinonyl aluminums, tridecyl aluminums, triphenyl aluminums, trinaphthyl aluminums, tritolyl aluminums, trimethylnaphthyl aluminums, the corresponding hydrocarbyl aluminum hydrides and dihydrides, and the corresponding hydrocarbyl aluminum chlorides, dichlorides, bromides, dibromides, iodides, diiodides, fluorides, and difluorides, etc.

Preferably the organometallic compound is an aluminum compound, more preferably an alkyl aluminum halide, most preferably ethyl aluminum dichloride. The organometallic compound is usually employed in an amount such as to provide an organometallic compound/transition metal salt mol ratio of about 0.5–15, preferably about 0.75–5, most preferably about four.

The proton donor may be one or more compounds selected from glycols and compounds corresponding to the formula ROH wherein R is hydrogen, alkyl, aryl, alkaryl, or aralkyl, and wherein any alkyl group contains up to five carbon atoms and any aryl group is phenyl or naphthyl. Exemplary of such compounds are water, ethylene glycol, propylene glycol, butylene glycol, pentylene glycol, methanol, ethanol, propanol, isopropanol, butanol-1, butanol-2, t-butanol, the pentanols, phenol, alpha- and beta-naphthols, cresols, xylenols, benzyl alcohol, etc. Preferably the proton donor is an alkanol containing one to five carbon atoms, especially ethanol. The proton donor is usually employed in an amount such as to provide a proton donor/transition metal salt mol ratio of about 1–6, preferably about 1–3, most preferably about 1.

Carbon monoxide is usually employed in an amount such as to provide a carbon monoxide/transition metal salt mol ratio of at least about 1, preferably about 1–6. When required to fill the reaction vessel, more than six molar proportions of carbon monoxide may be desirably employed, but there does not appear to be any other advantage to be derived from the use of an excess of carbon monoxide.

The manner in which the Butyl-type rubber is contacted with the catalyst composition is not critical. If desired, the catalyst components may be mixed together and allowed to react with one another before being added to the reaction mixture. However, it is usually preferable to form the catalyst in situ by adding the catalyst components separately to a reaction mixture containing the polymer to be treated. A particularly desirable method is to mix the proton donor with a solution of the transition metal salt in an aromatic hydrocarbon solvent such as benzene, toluene, xylene, etc., add the resultant solution to the polymer in a reaction vessel which has been purged with carbon monoxide, and then add the organometallic compound.

The reaction temperature is preferably maintained in the range of about 20°–60°C, room temperature being particularly convenient and satisfactory. Lower temperatures may be used but are less desirable because of the slower reaction rates at such temperatures. Temperatures higher than 60°C are usually undesirable because they may cause excessive molecular sizing. The reaction may be conducted at atmospheric, subatmospheric, or superatmospheric pressure.

Ordinarily the Butyl-type copolymer is maintained in contact with the catalyst composition for about 30 seconds to about 5 hours. Longer contact times are usually undesirable because of the excessive degree of molecular sizing which may be obtained when the contact time exceeds about five hours. When the temperature is maintained at about 20°–60°C, contact times in the range of about 30 seconds to about 2 hours, especially about 1 hour, have been found to be particularly satisfactory.

The molecular sizing reaction is conducted in the substantial absence of catalyst poisons such as oxygen and carbon dioxide, suitably in carbon monoxide atmosphere. To facilitate temperature control it is usually desirable to conduct the reaction in an inert diluent, e.g., a liquid saturated aliphatic hydrocarbon such as n-hexane, isooctane, cyclohexane, etc., an aromatic hydrocarbon such as benzene, toluene, xylene, etc., or a ring-halogenated aromatic hydrocarbon such as chlorobenzene, chlorotoluene, etc.

When the desired degree of molecular sizing is attained, the reaction may be terminated by any conventional technique, e.g., by the addition of an excess of water, methanol, ethanol, or isopropanol. The product may then be recovered by any conventional technique.

The products of the molecular sizing processes have lower molecular weights than the Butyl-type starting materials and vary in consistency from liquids to solids, depending on the degree of molecular sizing. They have narrow molecular weight distributions characterized by $M_w/M_n$ ratios of less than 4, frequently as low as 2. Products of particular interest are those having viscosity average molecular weights of about 50,000–200,000. Such products are useful in sealants, coatings, electrical encapsulants, blends, and binders; and they may be chlorinated to prepare low molecular weight chlorobutyl-type copolymers.

The following examples are given to illustrate the invention and are not intended as a limitation thereof. Unless otherwise specified, quantities mentioned are quantities by weight.

EXAMPLE I

Prepare solution A by dissolving 60 parts of an isobutylene-isoprene copolymer having a viscosity average molecular weight of about 430,000, a weight average molecular weight of about 379,000, and a number average molecular weight of about 199,000 in 400 parts of dry cyclohexane.

Prepare solution B by intimately mixing 0.084 part (1.83 molar proportions) of ethanol with a solution of 0.5 part (1.83 molar proportions) of molybdenum pentachloride in 35 parts of anhydrous benzene.

Prepare solution C by dissolving 0.093 part (7.32 molar proportions) of ethyl aluminum dichloride in hexane to form a 20 percent solution.

Purge a suitable reaction vessel with carbon monoxide and charge it with the copolymer solution while maintaining a carbon monoxide pressure of 50 psi (5.56 molar proportions). Heat the solution to 25°C. and stir. To the stirred solution add solution B and then solution C. One hour after the addition of solution C, add methanol to hydrolyze the catalyst. Isolate the reaction product by precipitation from a large excess of isopropanol, redissolve it in benzene, and recover it by vacuum stripping of the solvent.

The process results in a quantitative yield of a sized copolymer having a weight average molecular weight of 38,808, a number average molecular weight of 19,404, and an $M_w/M_n$ of 2.0.

EXAMPLE II

Repeat Example I except as follows:

1. Prepare solution B by intimately mixing 0.058 part (1.26 molar proportions) of ethanol with a solution of 0.5 part (1.26 molar proportions) of tungsten hexachloride in 35 parts of anhydrous benzene.

2. Prepare solution C by dissolving 0.64 part (5.04 molar proportions) of ethyl aluminum dichloride in hexane to form a 20 percent solution.

The process results in a quantitative yield of a sized copolymer having a weight average molecular weight of 34,188, a number average molecular weight of 16,632 and an $M_w/M_n$ of 2.0.

EXAMPLE III

Repeat Example I except as follows:

1. Prepare solution B by intimately mixing 0.063 part (1.37 molar proportions) of ethanol with 0.5 part (1.37 molar proportions) of rhenium pentachloride in 35 parts of anhydrous benzene.

2. Prepare solution C by dissolving 0.069 part (5.48 molar proportions) of ethyl aluminum dichloride in hexane to form a 20 percent solution.

Similar results are observed.

EXAMPLE IV

Repeat Example I except for conducting the reaction at 50°C. for 30 minutes. Similar results are observed.

Similar results are also observed when the materials specified in the foregoing examples are replaced by other materials taught in the specification to be equivalents thereof.

It is obvious that many variations can be made in the products and processes set forth above without departing from the spirit and scope of this invention.

What is claimed is:

1. In a molecular sizing process for preparing a low molecular weight isobutylene-conjugated polyene copolymer by contacting a higher molecular weight isobutylene-conjugated polyene copolymer having a combined polyene content of about 1–5 mol percent with a catalyst composition comprising one molar proportion of a transition metal salt, about 0.5–15 molar proportions of an organometallic compound of a metal of Group I-A, II-A, II-B, or III-A of the Periodic Table, and about 1–6 molar proportions of a proton donor selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl, the improvement which comprises narrowing the molecular weight distribution of the product by including as a catalyst component at least about one molar proportion of carbon monoxide; said higher molecular weight copolymer and said catalyst components being the only reactants in the process.

2. The process of claim 1 wherein the copolymer is contacted with the catalyst composition for about 30 seconds to about five hours at a temperature in the range of about 20°–60°C.

3. The process of claim 2 wherein the copolymer is contacted with the catalyst composition for about 1 hour at about 25°C.

4. The process of claim 1 wherein the higher molecular weight copolymer is a rubbery copolymer having a viscosity average molecular weight of about 300,000–500,000.

5. The process of claim 1 wherein the conjugated polyene is an aliphatic conjugated diene containing four to six carbon atoms.

6. The process of claim 5 wherein the conjugated diene is isoprene.

7. The process of claim 5 wherein the conjugated diene is butadiene.

8. The process of claim 1 wherein the catalyst composition consists essentially of one molar proportion of the transition metal salt, about 0.75–5 molar proportions of the organometallic compound, about 1–3 molar proportions of the proton donor, and about 1–6 molar proportions of carbon monoxide.

9. The process of claim 8 wherein the catalyst composition consists essentially of one molar proportion of the transition metal salt, about four molar proportions of the organometallic compound, about one molar proportion of the proton donor, and about 1–6 molar proportions of carbon monoxide.

10. The process of claim 1 wherein the transition metal salt is a halide of tungsten, molybdenum, or rhenium.

11. The process of claim 10 wherein the transition metal salt is tungsten hexachloride.

12. The process of claim 10 wherein the transition metal salt is molybdenum pentachloride.

13. The process of claim 1 wherein the organometallic compound is an organoaluminum compound.

14. The process of claim 13 wherein the organoaluminum compound is an alkyl aluminum halide wherein the alkyl group contains one to 10 carbon atoms.

15. The process of claim 14 wherein the alkyl aluminum halide is ethyl aluminum dichloride.

16. The process of claim 1 wherein the proton donor is an alkanol containing one to five carbon atoms.

17. The process of claim 16 wherein the alkanol is ethanol.

18. In a molecular sizing process for preparing a low molecular weight isobutylene-isoprene copolymer by contacting a higher molecular weight isobutylene-isoprene copolymer having a combined isoprene content of about 1–3 mol percent and a viscosity average molecular weight of about 300,000–500,000 with a catalyst composition comprising one molar proportion of a halide of tungsten, molybdenum, or rhenium, about 0.75–5 molar proportions of an alkyl aluminum halide wherein the alkyl group contains one to 10 carbon atoms, and about 1–3 molar proportions of an alkanol containing one to five carbon atoms and maintaining the copolymer in contact with the catalyst composition for about one hour at about 25°C., the improvement which comprises narrowing the molecular weight distribution of the product by including as a catalyst component about 1–6 molar proporations of carbon monoxide; said higher molecular weight copolymer and said catalyst components being the only reactants in the process.

19. The process of claim 18 wherein the catalyst composition consists essentially of one molar proportion of tungsten hexachloride, about four molar proportions of ethyl aluminum dichloride, about one molar proportion of ethanol, and about 1–6 molar proportions of carbon monoxide.

20. The process of claim 18 wherein the catalyst composition consists essentially of one molar proportion of molybdenum pentachloride, about four molar proportions of ethyl aluminum dichloride, about one molar proportion of ethanol, and about 1–6 molar proportions of carbon monoxide.

* * * * *